(12) United States Patent
Loison

(10) Patent No.: US 6,453,423 B1
(45) Date of Patent: Sep. 17, 2002

(54) COMPUTER REMOTE POWER ON

(75) Inventor: François Loison, Grenoble (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/346,219

(22) Filed: Jul. 1, 1999

(30) Foreign Application Priority Data

Jul. 15, 1998 (EP) ............................................. 98401802

(51) Int. Cl.⁷ ................................................. G06F 1/26
(52) U.S. Cl. ....................................... 713/310; 713/324
(58) Field of Search .............................. 713/310, 323, 713/324

(56) References Cited

U.S. PATENT DOCUMENTS

| | | | |
|---|---|---|---|
| 5,396,636 A | * 3/1995 | Gallagher et al. | 713/310 |
| 5,511,204 A | 4/1996 | Crump et al. | |
| 5,652,894 A | 7/1997 | Hu et al. | |
| 5,925,131 A | * 7/1999 | Novoa et al. | 713/300 |
| 6,125,449 A | * 9/2000 | Taylor et al. | 713/310 |
| 6,202,160 B1 | * 3/2001 | Sheikh et al. | 713/310 |

FOREIGN PATENT DOCUMENTS

| | | |
|---|---|---|
| EP | 0508685 A2 | 4/1992 |
| EP | 0735455 A2 | 3/1996 |

OTHER PUBLICATIONS

European Search Report, EP 98 40 1802, Dec. 16, 1998.

* cited by examiner

Primary Examiner—Glenn A. Auve

(57) ABSTRACT

The invention relates to a process for providing remote power on in a computer where the operating system disables switching off events in the power management control system, except the power button, before requesting the power supply unit to switch off. Under such circumstances, remote power on is not possible, even if a network card is present and receives remote power on signals. The invention suggests invoking a system management interrupt for enabling the remote power on events on the power management control system, after the operating system has disabled all events in the power management control system, except the power button. Thus, the events allowing remote power on are enabled before the power supply unit is switched off, although they were disabled by the operating system.

16 Claims, 2 Drawing Sheets

COMPUTER REMOTE POWER ON

FIELD OF THE INVENTION

The invention relates to the field of computers, and more specifically to the power management of computers. Power management, and essentially power saving is becoming an important concern for computer manufacturers, inter alia for environmental reasons. It is also a concern for battery-operated computers such as laptop computers.

Another concern for computers is the remote management of computers through local area networks or wide area networks. This concern is becoming important as the existing number of networked computers increases.

BACKGROUND OF THE INVENTION

FIG. 1 is a representation of the state machine of a computer of the type currently sold by the applicant under the reference HP Vectra VL8. As shown on this figure, the computer may be in five different states. In the first one 1, the computer is off and unplugged, and the power consumption is nil; in a second state 2, the computer is OFF; in this state, the power supply unit is connected to the power supply, and the computer is off. However, the LAN card of the computer is in a sleep mode, that is the LAN is not available, however, the LAN is always powered and the LAN processor in the LAN network card scans networks frames. In this state, pursuant to the German Ecolabel, the power consumption of the computer should be less than 5 W. The third state 3 is the ON state, with the computer working; power consumption is then not subject to any particular constraints. The fourth state 4 is the sleep mode, where the functionalities of the computer are degraded; in this state, the power supply unit is on, and the computer as well as its LAN card are in a sleep mode. In this fourth state, pursuant to the recommendations of the US Energy protection Agency, the power consumption should be less than 30 W. The fifth state 5 is a state where the computer is plugged in, but switched off; this state is entered when there is a power failure while the computer is connected to the wall.

The computer passes from the second state to the third state, as symbolized by arrow 6 when the ON/OFF button of the computer is activated to switch the computer on. As symbolized by arrow 7, the computer passes from the fourth state—sleep mode—to the third state—ON—when the computer is woken up. This may for instance be the case when the user presses a key on the keyboard of the computer.

For computers connected to a network, it has been suggested to allow both operations to be conducted from the LAN. The corresponding functions—Remote Power-On or RPO and Remote wake-up or RWU, respectively—are implemented on the computers sold by the applicant with the Hewlett-Packard NightDirector features. Remote power on is the ability to power on a PC remotely, from the OFF state; remote wake up is the ability to wake up a PC from energy saving sleep mode. These functions enable remote management applications to be carried out on remote computers. They basically involve sending a wake up or power on frame on the network; this frame is received and interpreted by the LAN card of the computer. A proprietary connector is used to connect the LAN card to the motherboard, so that RPO or RWU signals may be transmitted from the LAN card processor to the motherboard. For instance Hewlett-Packard provides on some of its personal computers a NightDirector (a trademark of Hewlett Packard Company) connector that comprises 5 RPO/RWU related pins, that is ground and power (Vccaux) pins, together with a power on pin, a wake-up pin and a RPO enable pin.

Advanced Power Management (APM) is a specification co-developed by-Intel Corporation and Microsoft Corporation, that consists of one or more layers of software that support power management in computers with power manageable hardware. APM defines the hardware independent software interface between hardware-specific power management software and an operating system power management policy driver. It masks the details of the hardware, allowing higher-level software to use APM without any knowledge of the hardware interface. The APM software interface specification defines a layered cooperative environment in which applications, operating systems, device drivers and the APM BIOS work together to reduce power consumption.

APM partitions power management functionality into a hierarchy of cooperating layers and standardizes the flow of information and control across the layers. The software components in an APM system comprise:

The APM BIOS is the software interface to the motherboard and its power managed devices and components.

The APM Interface is the interaction between the APM Driver and the APM BIOS.

The APM Driver module connects to the APM BIOS and controls power management policy. The APM Driver communicates with APM-aware Applications.

APM-aware Applications interface with the APM Driver to monitor and/or control power management.

The APM-aware Device Driver modules provide power management software interface for add-in devices. See Advanced Power Management (APM) BIOS Interface Specification, Revision 1.2 February 1996 for a full description of APM software.

OnNow is a design initiative proposed by Microsoft Corporation, as a comprehensive system-wide approach to system and device power control. OnNow relies on the ACPI interface to improve the integration of PC hardware and software, for simpler operation and greater reliability; OnNow ensures that the operating system assumes full responsibility for power management, in response to usage input from the user, applications and device drivers. OnNow is based on a standard set of detailed system power states defined by system designers and implemented by the operating system. The system states are defined in the following table:

TABLE I

OnNow system states

| Power State | Description |
| --- | --- |
| Working | On. System is fully usable; power conservation is occurring on a per-device basis. |
| Sleeping | Appears off. Power consumption is reduced. The system returns to the Working state in an amount of time inversely proportional to the power consumption. |
| Soft Off | Appears off. Very low power consumption. The system returns to the Working state after a full reboot. |

ACPI—standing for Advanced Configuration and Power Interface—is an open industry specification co-developed by Intel, Microsoft and Toshiba. ACPI defines a flexible and extensible interface that allows system designers to select appropriate cost/feature trade-offs for power management. The specification enables new power management technology to evolve independently in operating systems and hardware, while ensuring that they continue to work together. See Advanced Configuration and Power Management specification, Rev. 1.0 for a complete description of the structures and mechanisms necessary to design operating system directed power management and make advanced configuration architectures. Key ACPI functions, as listed in Table II, are usually implemented in a single chip called the ACPI controller; other ACPI functions may also be implemented in the ACPI controller, or may be distributed in other hardware in the computer. This table does not provide the ACPI interface components for each function, nor does it comprise the necessary resources for implementing the functions.

TABLE II

ACPI controller functions.

| ACPI function | Description |
| --- | --- |
| PM Timer | 24/32 bits ACPI timer |
| Power Button | Logic to signal to OS power button presses |
| Power Button override | Hardware user sequence to turn system off (4 seconds press) |
| Sleep/Wake-up control logic | Logic to control Sleep/Wake-up transitions |
| SCI generator | Generates a SMI or an interrupt |
| General purpose events | General purpose events controlled by OS |
| Power supply | Turn power supply on or off, put in low power mode |

FIG. 2 is a schematic diagram of an ACPI controller, used as a power management control system. FIG. 2 also shows the ON/OFF controller 58, that controls the computer power supplies 59. The controller of FIG. 2 comprises a series of event registers 50 for general-purpose events. Each event register is comprised of one status bit 51 and one enable bit 52, that may be updated by the different hardware or software components of the computer, as symbolised by arrows 53 and 54 on FIG. 2.

The controller further comprises an off control register 56, that may be activated by a sleep enable bit SLP_EN, when a SLP_TYP=S4, S5 is asserted. The off control register, when activated, issues a power off request to the ON/OFF controller 58, for power down. The controller comprises a power button register 57, that is enabled by the power off request, and is activated by pressing the power button. When the power button is pressed, the power button register issues a power on request to the ON/OFF controller, for powering the computer; it also asserts a SysSCI_X signal for boot of the computer.

The power controller comprises a Sleep control 60 and a Wake control 61. The sleep control is may be activated by a sleep enable bit SLP_EN, when a SLP_TYP S3 is asserted. The sleep control then issues commands to operational elements of critical devices, for setting the computer to one of the S0 to S3 sleep states. The wake control 61 when enabled by a wake-up event of the general purpose events 50 issues commands to operational elements of critical devices for wake-up of the computer from one of the S0–S3 sleep states, as symbolised on FIG. 2 by arrows 62.

Not shown in FIG. 2 are other elements of the power management control system, such as the interrupt controller, for receiving system management interrupts, or the power management timer.

The operation of the power management control system is dictated by the contents of the different registers-general-purpose events, power off and power on. According to the contents of these registers, the control system issues commands to the different hardware of the computer for power management.

The present solution for carrying out RPO or RWU is based on APM. At the same time, the operation of the next generation technology under OnNow is also explained. Table III shows the different elements of a personal computer, seen from the point of view of power management, under APM or OnNow.

TABLE III

APM and OnNow Power management

| Power management | APM | OnNow |
| --- | --- | --- |
| Hardware | non standard | ACPI mother board |
| Bios | Standard bios; RPO/RWU differences allowed | ACPI; some differences allowed under OnNow |
| Drivers | standard; RPO/RWU differences allowed | OnNow; differences are not allowed |
| OS | Windows 95, Windows 3.11; RPO/RWU not supported | Windows 98, NT 5 RPO not supported |

Under APM, RPO and RWU features may be implemented at bios level, since the operating system does not provide such features and allows bios differentiators. RPO under APM, when an ACPI controller is used, is now explained. The computer is assumed to be in the second state of FIG. 1, where the power supply unit is connected to the power supply, and where the LAN is powered, e.g. through by Vccaux through a LAN card cable. A remote power on frame is sent over the network, and is received on the LAN card, and interpreted by the LAN card processor. A corresponding power on signal is sent through the LAN card cable; this signal is applied to the RPO register of the ACPI controller, and the ACPI controller issues a command to the power supply unit for switching on the computer. The bios and the OS then boot.

OnNow uses the power states discussed in Table I. Since the purpose of OnNow is to ensure that the operating system has full responsibility for power management, OnNow does not include RPO features, and does not allow those features to be implemented at bios level, independently of the operating system. The switching off of a computer running OnNow is the following. When the operating system decides that the computer is to be turned off, all software accesses are first stopped; then, all switching on events of the ACPI controller are disabled, except the power button. The corresponding disabling is written in the enabling bit of all registers of the ACPI controller except the one of the power button; the computer is then switched off, by writing into the PM1_CNT register of the controller, that is by writing into the register of the controller connected to the ON/OFF controller. Writing into the PM1_CNT register causes the power supply to switch off.

Since all events of the ACPI controller except the power button are disabled before the hardware turns the machine off, the known solution of defining at bios level a remote power on event cannot be carried out in a computer running OnNow. Indeed, the corresponding event would be disabled by OnNow before the hardware is switched off.

Accordingly, there exists a need for a solution that may allow RPO functions, and especially for those computers using Windows 98 or NT5, where the power management is controlled by the operating system, and where RPO at bios level is not authorized by the operating system.

U.S. Pat. No. 5,175,853, entitled "Transparent System interrupt" discloses a method and apparatus for providing transparent system interrupts; these interrupts are system level interrupts, that may not be relocated or overwritten by any operating system or application. They are invoked by the assertion of an electrical signal at an external pin of the CPU of a microprocessor-based chip set. This documents suggests to use these interrupts for power management functions, whereby the processor and/or other system devices may be shut down during periods of non-use and then restarted without the need to go through a power up routine.

Upon assertion of the electrical signal at the external pin of the CPU chip, the CPU maps a normally unmapped dedicated RAM area where the transparent system interrupt routine is stored as a predetermined area of the main memory space, saves the current CPU state into the dedicated RAM space, and begins execution of the transparent system interrupt routine. Recovery from the transparent system interrupt is accomplished upon recognition of an external event that invokes a "resume" instruction causing the CPU to be restored to exactly the same state that existed prior to the transparent system interrupt.

One example of use of the system interrupt given in this document is the following: if power to a hard drive is removed for power saving purposes, an I/O trap function is used for detecting request for access to the hard disk; a transparent interrupt routine is then generated to reapply power to the disk drive, to reinitialize it and to restore program operation at the I/O instruction.

U.S. Pat. No. 5,291,604 suggests adding one instruction to the transparent interrupt routines, for checking whether the microprocessor was interrupted or not during the halt state; this relieves the writer of the transparent system interrupt from the burden of managing halt state restart. More details on the operation of such transparent interrupt routines or system management interrupts may be found in those two documents, or in Intel 486 processor reference book.

Standard ACPI controllers actually comprise several sleep modes Sx. S1 is a sleep mode where the processor is stopped. S4 is a sleep mode where an image of the memory is copied on the hard disk, and where the processor is physically switched off. S5 is the off mode, where the processor is physically switched off. Switching on from S5 involves booting the bios, and booting the operating system. Switching on from S4 involves booting the bios, and copying the image memory from the disk. Under S5, all events of the ACPI controller except the power button are disabled; under S4, all wake up events are enabled to allow wake up of the processor. In some sleep states, such as S1, S2 or S3, the power supply is on and the main voltage Vcc is available; in some sleep states, such as S4 and S5, the power supply is switched off so that the main voltage Vcc is not available; however, an auxiliary voltage Vaux or Vtrickle is available.

Windows 95 proposes to use virtual I/O ports for simulating virtual DOS machines. The OS creates an internal task, and this task is actually supposed to be a DOS machine. I/O accesses of the DOS machine are directed to virtual access, that are redirected to the OS.

SUMMARY OF THE INVENTION

According to the invention, there is provided a process for providing remote power on in a computer having a power management control system and in which the operating system disables switching on events in the power management control system at power-down, comprising the step of invoking a system management interrupt for enabling at least a remote power on event in the power management control system, said system management interrupt being invoked at power-down after the operating system has disabled at least a remote power on event in the power management control system.

In one embodiment of the invention, said system management interrupt enables a remote power on event for a network card. The system management interrupt may also enable a remote power on event for an ON/OFF controller.

The process may preferably comprise detecting an operating system power-down action and invoking said system management interrupt in response to such detection.

In one embodiment, the operating system requests power-down by writing into a power-down event register of the power management control system, and the process comprises the step of input/output trapping said power-down event register for invoking said system management interrupt.

In another embodiment, the operating system requests power-down by writing into a power-down event register of the power management control system, and the process comprises the steps of providing the operating system with a dummy address for the power-down event register, and input/output trapping the register having said dummy address for invoking said system management interrupt, said system management interrupt writing in said power down event register after enabling at least a remote power on event.

The invention also provides a computer, comprising
 a power management control system having at least a remote power-on event;
 a processor having a system management interrupt for enabling at least the remote power on event;
 an operating system disabling at least said remote power-on event in the power management control system at power-down said power management control system having means for invoking said system management interrupt after the remote power-on event is disabled by the operating system at power-down of the computer.

Preferebly, the system management interrupt enables a remote power on event for a network card. It may also enable a remote power on event for an ON/OFF controller In one embodiment, the computer comprises means to detect an operating system power-down action, said means for invoking said system management interrupt being arranged to invoke said system management interrupt in response thereto.

Preferably, the power management control system has a power-down event register in which the operating system writes for requesting power-down, and the means for invoking said system management interrupt comprise an input/output trap to said power down event register.

In another embodiment, the power management control system has a power-down event register in which the operating system writes for requesting power-down, and a table of registers indicating the address of the power-down event register, and the operating system writes to the event register having said address for requesting power-down, wherein said table indicates a dummy address for the power-down event register, and wherein said means for invoking said system management interrupt comprise an input/output trap to the event register having said dummy address, said system management interrupt writing in said power down event register after enabling at least a remote power on event.

BRIEF DESCRIPTION OF THE INVENTION

A power management system embodying the invention will now be described, by way of non-limiting example, with reference to the accompanying drawings, in which FIG. 1 is a state machine of a prior art computer;

BEST MODE OF CARRYING OUT THE INVENTION

The invention has the purpose of providing RPO capabilities, although the OS disables all switching on events but the power-on before switching off the power supply unit. For this purpose, a system management interrupt (SMI) is used; this SMI is invoked or activated after the operating system has disabled the remote power on event of the ACPI controller, and before the power supply unit is switched off. Usual elements of a computer that are not pertinent to the invention are not described in this specification.

Such a SMI, as described in U.S. Pat. No. 5,175,853, is executed by the Processor after an image of the memory is saved; such interrupt is a system level interrupt, that may not be relocated or overwritten by any operating system or application. In this embodiment of the invention, the system management interrupt has the purpose of re-enabling the RPO event of the ACPI controller. After the RPO event is enabled, the operation of the processor is resumed, and the power supply unit is turned off. However, at that time, the RPO event of the controller is enabled, so that the LAN card may turn the computer on when a RPO frame is received.

Figure 3:
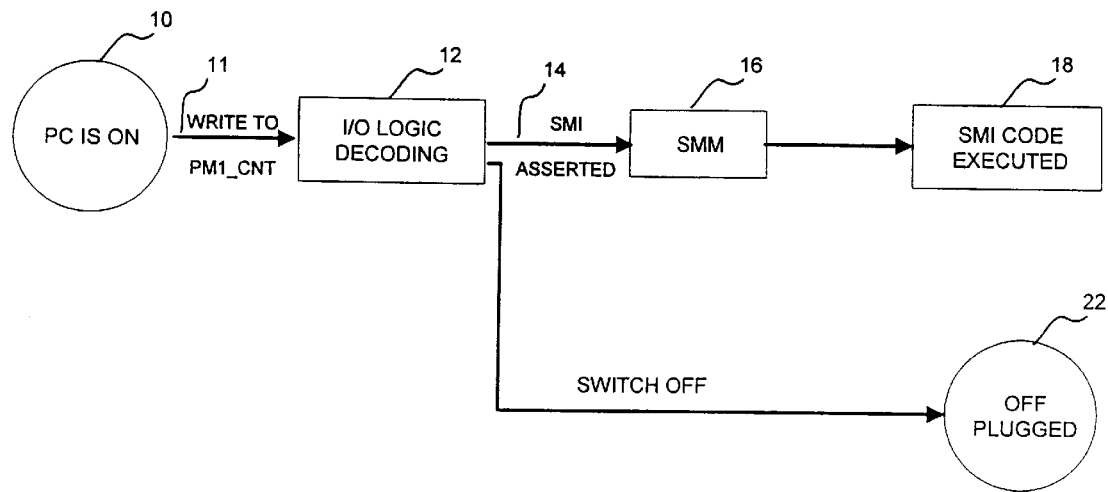
FIG. 3 shows a flowchart of a switch off operation according to an embodiment of the invention.

FIG. 3 shows a possible flowchart of a switch off operation according to an embodiment of the invention. FIG. 3 uses a SMI code invoked by setting the SMI pin of the processor, when the operating system writes into the PM1_CNT register of the ACPI controller. This may be obtained by appropriate firmware in the ACPI register, and by appropriate wiring of the ACPI controller, for updating the system management interrupt number SMI#, and for setting the pin of the ACPI controller that is connected to the SMI pin of the processor.

Figure 1:
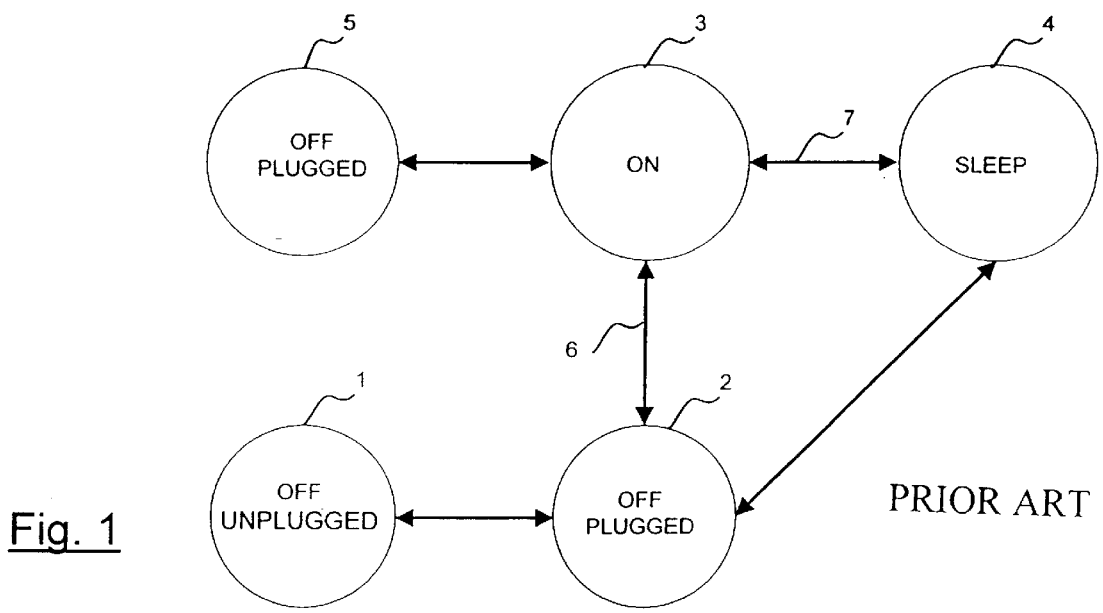
Figure 2:
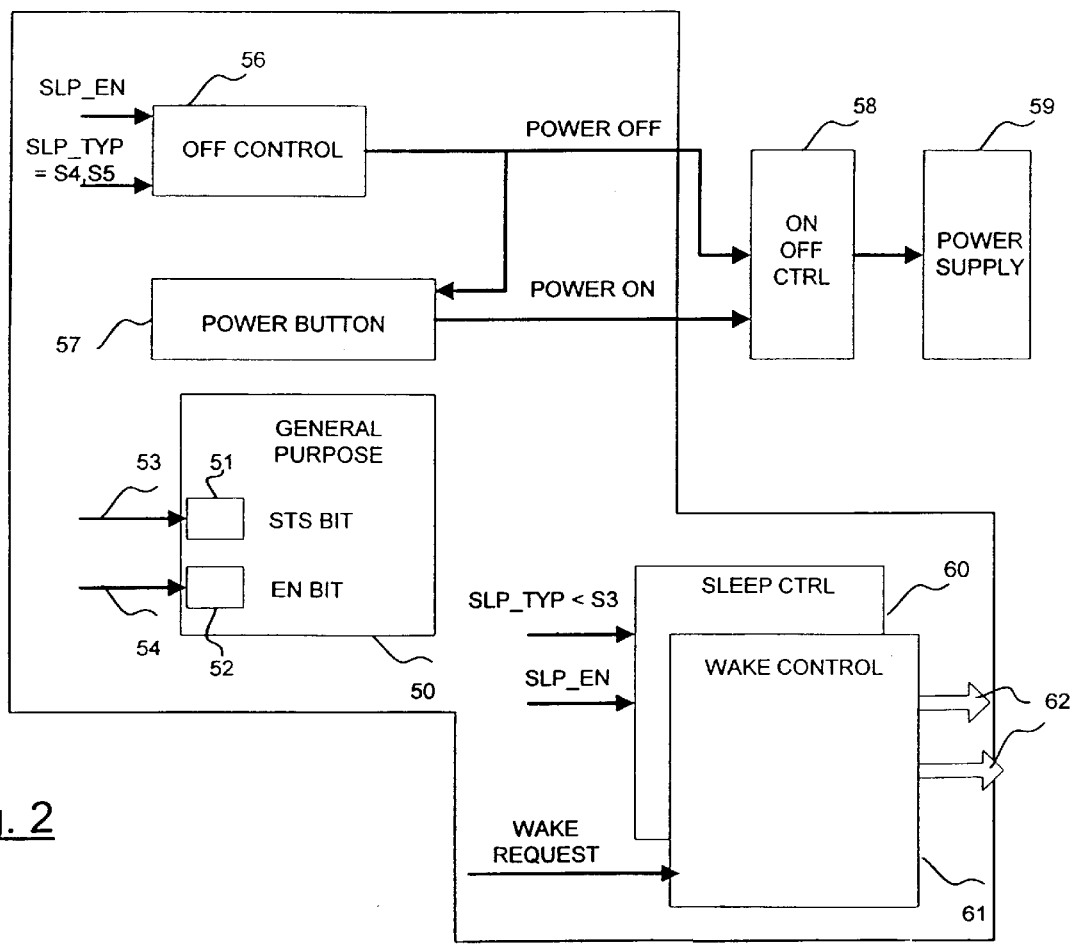
FIG. 2 is a schematic view of an ACPI controller.

The operation of the computer at switch off is therefore the following. Assume the computer is in the on state referenced 3 on FIG. 1, as shown in step 10. First, the operating system stops all software accesses. Then the operating system disables all switch-on events, such as a RPO event, by writing in the corresponding enable registers of the ACPI controller. The operating system then writes in the PM1_CNT register of the controller, as shown by arrow 11, for requesting switch off of the power supply unit. At that time, the operating system stops all activities, and considers the computer as switched off.

When the operating system writes in the PM1_CNT register, the I/O logic decodes the writing in the register, at step 12, and the controller sets the SMI# to point to the SMI address, and sets the SMI pin to assert the SMI. This is shown by arrow 14. The microprocessor then goes to the system management mode or SMM, that is to the mode triggered by asserting the SMI pin, as shown in 16.

The SMI code is then executed by the microprocessor, see reference 18, whereby at least a RPO event is enabled in the ACPI controller, by setting the corresponding enable bit of the ACPI register, reference 18. The processor may then go back to the normal mode, where it waits for further commands.

In the meantime, while the SMI is asserted and the RPO is enabled, switch off progresses, as shown in 20. The power supply unit receives the switch off command from the PM1_CNT register, and switches off. The computer is then in the fifth state 5 of FIG. 1, see reference 22 on FIG. 3. The main power Vcc is then switched off. However, the auxiliary power Vaux is still available, and powers the processor of the LAN card, if there is one.

RPO may then be carried out, as in the prior art configuration. If an RPO frame is received on the network, it is interpreted by the processor of the LAN card, and the status bit of the RPO event is set in the corresponding register of the ACPI controller. Since the enable bit was set by the SMI, the controller may switch the computer on, in a manner known per se.

In some versions of the ACPI software, the call to the SMI, at the same time the PM1_CNT register is set, may cause some problems. Indeed, the switching off of the power supply unit may be suspended, notwithstanding the activity of the processor executing the SMI according to the invention. In this case, the main power supply to the processor may be interrupted before the SMI according to the invention is executed. In this respect, the parallel critical path of FIG. 3—firmware enables RPO in SMM of processor while switch off is under progress—may cause a problem.

A solution is also provided to this additional problem. A fake register is defined, together with an I/O trap for invoking the SMI that enables the RPO event. A dummy (or fake, or virtual) PM1_CNT register is defined in the ACPI table, that will not be connected to the ON/OFF controller; this dummy register is however used for setting the SMI# and for invoking the SMI. In this case, the SMI will, preferably as a last step, set the register, that is connected to the ON/OFF controller.

Figure 4:
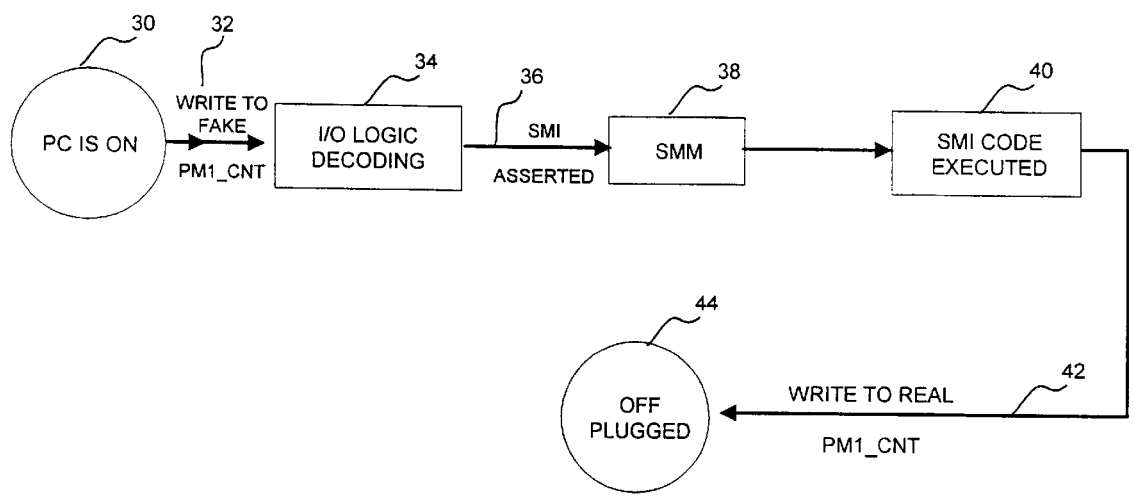
FIG. 4 shows a flowchart of a switch off operation according to another embodiment of the invention.

The operation of the invention in this embodiment is shown on the flowchart of FIG. 4. The computer is initially in the ON state, see 30 in FIG. 4. At switch off, the operating system disables all switch-on events, save the power-on button. The operating system then sets the dummy PM1_CNT register defined in the ACPI table, see 32 in FIG. 4; the operating system is thereafter inactive, since it considers the computer to be switched off, and to be in the S5 state.

However, since the fake PM1_CNT defined in the ACPI table is not connected to the ON/OFF controller, the ON/OFF controller does not switch Vcc off. The setting of the PM1_CNT register by the operating system does not activate the ON/OFF controller, but is simply decoded by the I/O logic, as shown in 34 on FIG. 4. The I/O logic sets the SMI# to the number of the SMI according to the invention, and asserts the SMI pin of the processor, as shown by 36 on FIG. 4. The processor then goes to system management mode—see 38 on FIG. 4—and executes the SMI of the invention, whereby the RPO event of the ACPI controller is enabled—see 40 on FIG. 4 —. The SMI further comprises instructions for setting a register of the ACPI controller connected to the ON/OFF controller, as shown by arrow 42 on FIG. 4. Thus, the register of the ACPI connected to the ON/OFF controller is set, and the SMI is ended. The processor returns to normal mode.

At that time, the ON/OFF controller is activated, due to the activation of the corresponding ACPI register, and the main power supply Vcc is switched off. The computer goes to the OFF plugged mode 5 of FIG. 1, as shown by 44 on FIG. 4. It should be noted that this embodiment of the invention ensures that the main power supply Vcc cannot be switched off before the RPO events of the controller are enabled.

The code for the system management interrupt according to this embodiment of the invention may be essentially identical to the one of the embodiment of FIG. 3; however, the last line set the ACPI register connected to the ON/OFF controller. In addition, as explained above, the PM1_CNT register defined i n the ACPI table is a fake or dummy register.

This embodiment of the invention does not induce any problem with the operation of the computer; the PM1_CNT register may only be set by the opera ting system, and will only be set when the computer is switched off. There is no reason that this register be set under different circumstances. Even if this were the case, the operation of the invention would not change anything, except set the RPO event in the controller.

In the embodiments of the invention described above, it is possible to enable other events than the RPO event of the controller. In some instances, it may be necessary to enable the LAN card event, for allowing the LAN card to operate and recognize the RPO frame. It may also be necessary to enable the RPO event in the ON/OFF controller.

The invention is not limited to the embodiments discussed above. It applies not only to OnNow, but to any operating system that disables events before switching off the computer.

In addition, the SMI I/O trap described above may be used for other purposes, and generally for carrying out any action at the firmware's level, without any control from the OS. Examples of possible uses of the SMI I/O trap follow. The SMI I/O trap according to the invention may be used for correcting hardware errors. If one component is bugged, access to this component may be directed to a fake or dummy ACPI register; a SMI is asserted when the fake register is addressed, for correcting the error. The bug or error may for instance be caused by a timing problem; in this case, the SMI would simply allow the necessary time to lapse, so that the timing problem be solved. The SMI would then assert the "actual" ACPI. register for accessing the component.

The bug or error could also be induced by inadequacy of parameter in other components. In this case, the SMI would simply change the value of the said parameter, so as to allow proper operation of the component. Again, the. SMI would thereafter address the "real" event or register for accessing the component.

The SMI I/O trap described above may also be used for addressing a bus, for instance a I2C or SMBus. This type of bus is presently used in the applicant's computers for the management of temperature, without control of the OS. Allowing access of the OS to such a bus is a complicated task, notably in view of the fact that the bus may assert a SMI if and when there is a problem with the temperature of one component of the computer; OS drivers must thus be adapted to take into account a possible interruption of the operation of the OS if the SMI is asserted. The use of a SMI I/O trap on a fake register is a simple and efficient way to allow the OS to access the I2C or SMBus. From the point of view of the OS, access to the bus is ensured simply by addressing an I/O register of the controller. This register is actually a fake or dummy register, that does not actually access the bus, but sets a system management interrupt. The system management interrupt manages access to the bus, by accessing the corresponding "actual" register, and provides the requested result to the appropriate register for use by the OS. Since access to the I2C or SMBus is provided by a SMI, there is no need to take care of possible interruption by another SMI, such as the one that may be asserted by the firmware in case there is a temperature problem. This solution applies not only for the management of temperature, but also for the management or monitoring of other operating parameters of the computer, such as voltage, angular speed of fans, etc.

Thus, several other uses of the process embodied in FIG. 3 were discussed and may be contemplated; in all instances, the OS addresses a dummy, fake or virtual register, on which an I/O trap is provided; the I/O trap invokes a SMI, and the SMI addresses another register. This other register is actually connected to the device or component which the OS desires to access; it may thus be called the "actual" or "real" register. In terms of product, the computer has an I/O controller having at least two registers, an I/O trap on one of the registers, and a SMI invoked by the I/O trap. The SMI has at least one instruction for writing in another register— that is in the "actual" or "real" register.

Other uses of this process may be found, whereby it is possible to bypass control of the OS, or to provide additional features for the OS.

What is claimed is:

1. A process for providing remote power on in a computer having a power management control system and in which the operating system disables switching on events in the power management control system at power-down, comprising the step of invoking a system management interrupt for enabling at least a remote power on event in the power management control system, said system management interrupt being invoked at power-down after the operating system has disabled at least a remote power on event in the power management control system.

2. The process according to claim 1, wherein said system management interrupt enables a remote power on event for a network card.

3. The process according to claim 2, comprising detecting an operating system power-down action and invoking said system management interrupt in response to such detection.

4. The process according to claim 1, wherein said system management interrupt enables a remote power on event for an ON/OFF controller.

5. The process according to claim 4, comprising detecting an operating system power-down action and invoking said system management interrupt in response to such detection.

6. The process according to claim 1, comprising detecting an operating system power-down action and invoking said system management interrupt in response to such detection.

7. The process according to claim 6, wherein the operating system requests power-down by writing into a power-down event register of the power management control system, the process comprising the step of input/output trapping said power-down event register for invoking said system management interrupt.

8. The process according to claim 6, wherein the operating system requests power-down by writing into a power-down event register of the power management control system, the process comprising the steps of providing the operating system with a dummy address for the power-down event register, and input/output trapping the register having said dummy address for invoking said system management interrupt, said system management interrupt writing in said power down event register after enabling at least a remote power on event.

9. A computer, comprising a power management control system having at least a remote power-on event;

a processor having a system management interrupt for enabling at least the remote power on event;

an operating system disabling at least said remote power-on event in the power management control system at power-down said power management control system having means for invoking said system management interrupt after the remote power-on event is disabled by the operating system at power-down of the computer.

10. The computer according to claim 9, wherein said system management interrupt enables a remote power on event for a network card.

11. A computer according to claim 10, comprising means to detect an operating system power-down action, said means for invoking said system management interrupt being arranged to invoke said system management-interrupt in response thereto.

12. The computer according to claim 9, wherein said system management interrupt enables a remote power on event for an ON/OFF controller.

13. A computer according to claim 12, comprising means to detect an operating system power-down action, said means for invoking said system management interrupt being arranged to invoke said system management interrupt in response thereto.

14. A computer according to claim 9, comprising means to detect an operating system power-down action, said means for invoking said system management interrupt being arranged to invoke said system management interrupt in response thereto.

15. The computer according to claim 14, wherein the power management control system has a power-down event register in which the operating system writes for requesting power-down, and wherein said means for invoking said system management interrupt comprise an input/output trap to said power down event register.

16. The computer according to claim 14, wherein the power management control system has a power-down event register in which the operating system writes for requesting power-down, and a table of registers indicating the address of the power-down event register, wherein the operating system writes to the event register having said address for requesting power-down, wherein said table indicates a dummy address for the power-down event register, and wherein said means for invoking said system management interrupt comprise an input/output trap to the event register having said dummy address, said system management interrupt writing in said power down event register after enabling at least a remote power on event.

* * * * *